(12) United States Patent
Chang

(10) Patent No.: US 7,616,437 B2
(45) Date of Patent: Nov. 10, 2009

(54) VIBRATION DAMPING MECHANISM AND ELECTRONIC DEVICE HAVING THE DAMPING MECHANISM

(75) Inventor: Chun Chang, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 0 days.

(21) Appl. No.: 12/145,671

(22) Filed: Jun. 25, 2008

(65) Prior Publication Data

US 2009/0195976 A1    Aug. 6, 2009

(30) Foreign Application Priority Data

Feb. 5, 2008    (TW) .............................. 97202594 U (51) Int. Cl.
*G06F 1/16* (2006.01)
(52) U.S. Cl. ............................ 361/679.34; 361/679.27; 248/680; 62/259.2; 165/104.26; 65/225
(58) Field of Classification Search ............ 361/679.01, 361/679.08, 679.09, 679.23, 679.27; 248/633, 248/638, 680; 62/228.4, 259.2; 165/80.3, 165/104.26; 65/206, 207, 225, 157
See application file for complete search history.

(56) References Cited

U.S. PATENT DOCUMENTS

| | | | | |
|---|---|---|---|---|
| 5,982,587 | A * | 11/1999 | Alagheband et al. | 360/256 |
| 6,252,768 | B1 | 6/2001 | Lin | |
| 6,765,751 | B2 * | 7/2004 | Huang et al. | 360/97.01 |
| 7,353,524 | B1 * | 4/2008 | Lin et al. | 720/633 |
| 2008/0043434 | A1 * | 2/2008 | Tatsukami et al. | 361/697 |
| 2008/0145042 | A1 * | 6/2008 | Kawai et al. | 396/55 |

FOREIGN PATENT DOCUMENTS

TW    437980    5/2001

* cited by examiner

*Primary Examiner*—Hung V Duong
(74) *Attorney, Agent, or Firm*—Hunton & Williams LLP (57) ABSTRACT

A vibration damping mechanism includes a frame, cushioning members, a heat sink, and fastening members. The frame has a base plate and supporting arms disposed on the base plate. Each cushioning member is disposed on a respective one of the supporting arms, and has a through hole. The heat sink supports a hard disk thereon such that the hard disk lies flat against and is secured on the heat sink, and has a plurality of fastening holes. Each fastening member extends through the respective through hole and threadedly engages the respective fastening hole such that the heat sink is suspended on the supporting arms and abuts against the cushioning members. Thus, the area of contact between the heat sink and the hard disk is increased to enhance the heat transfer efficiency, and the cushioning members provide the heat sink and the hard disk with a cushioning effect.

19 Claims, 8 Drawing Sheets

VIBRATION DAMPING MECHANISM AND ELECTRONIC DEVICE HAVING THE DAMPING MECHANISM

CROSS-REFERENCE TO RELATED APPLICATION

This application claims priority of Taiwanese Application No. 097202594, filed on Feb. 5, 2008.

BACKGROUND OF THE INVENTION

1. Field of the Invention

The invention relates to a vibration damping mechanism, more particularly to a vibration damping mechanism for mounting of a hard disk thereon and capable of providing the hard disk with good heat dissipating and vibration damping functionalities, and to an electronic device having the vibration damping mechanism.

2. Description of the Related Art

A hard disk is a dynamic component in a computer system, and is relatively sensitive to heat and vibrations. If problems associated with heat dissipation of the hard disk and effects of vibration of a computer housing that is subjected to an external force on the hard disk cannot be effectively solved, the computer system may crash or hang. Generally, there are several ways of effecting heat dissipation for a hard disk.

Figure 1:
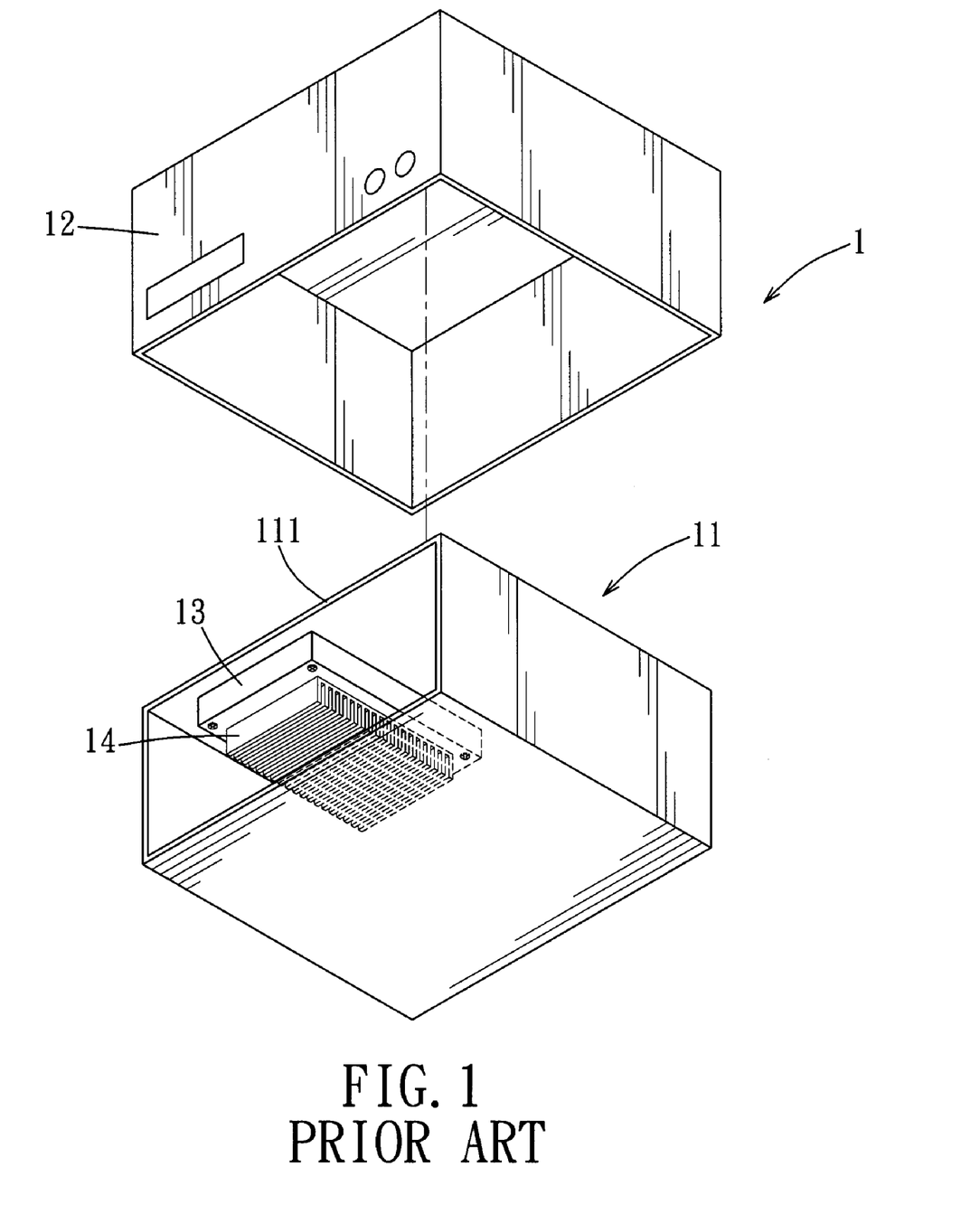
FIG. 1 is a perspective view of a conventional computer to illustrate a hard disk with a heat sink for dissipating heat of the hard disk.

With reference to FIG. 1, a computer 1 includes a frame 11, a housing 12 for covering the frame 11, and a hard disk 13. The hard disk 13 is fastened to a bottom face of an upper frame panel 111 of the frame 11 by screws, and has a bottom face to which a heat sink 14 is attached. The arrangement of the heat sink 14 enhances heat dissipation of the hard disk 13. However, heat dissipated from the hard disk 13 by the heat sink 14 still remains in the interior of the computer 1, so that the heat dissipating effect is unsatisfactory. In addition, since no vibration damping mechanism is provided between the hard disk 13 and the frame 11, when the housing 12 is subjected to an external impact, the hard disk 13 may crash due to the effect of vibration, or the heat sink 14 may separate from the hard disk 13 due to the vibration.

Figure 2:
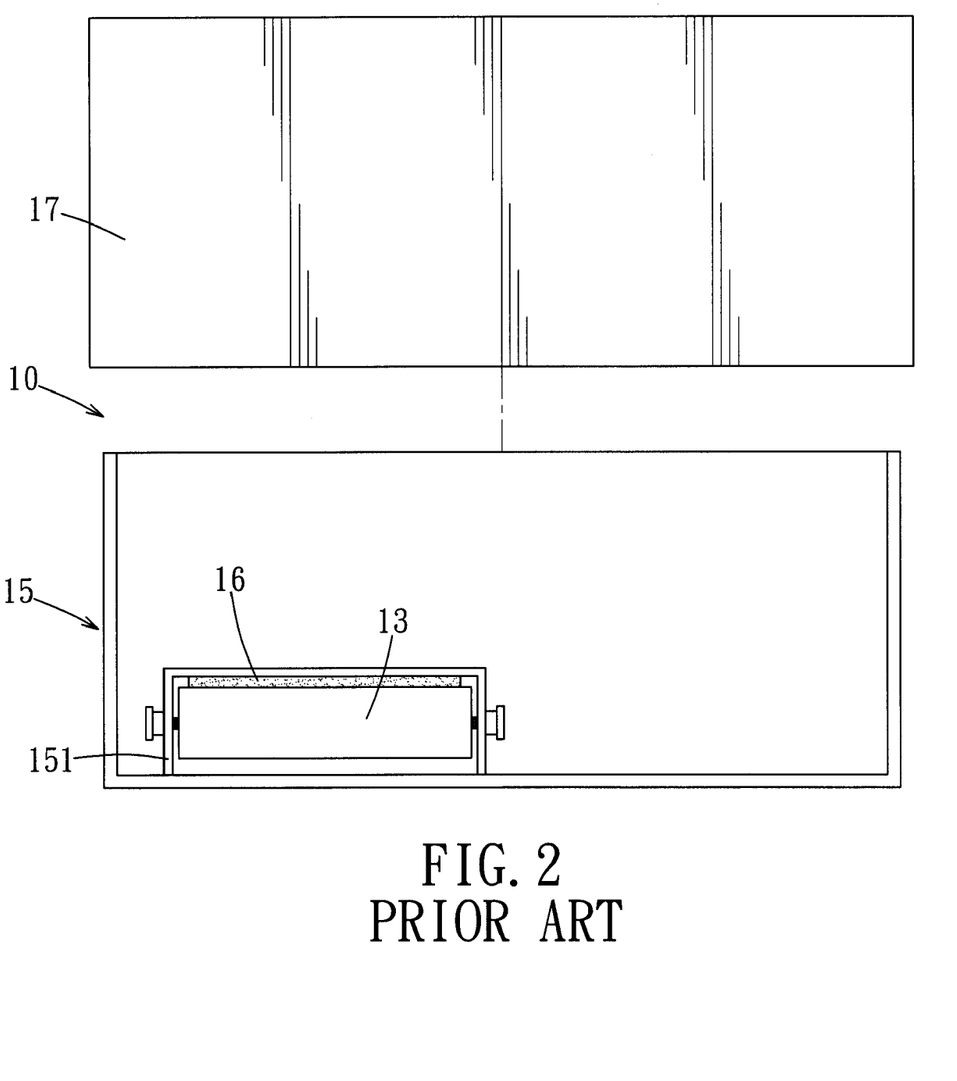
FIG. 2 is a schematic view of another conventional computer to illustrate a hard disk whose heat is transferred to a frame via a thermal pad.

With reference to FIG. 2, another approach of dissipating the heat of the hard disk 13 in a computer 10 is to dispose a thermal pad 16 between a securing seat 151 of a frame 15 and the hard disk 13. The thermal pad 16 transfers the heat generated by the hard disk 13 to the securing seat 151 of the frame 15 and a housing 17 of the computer 10 to thereby achieve heat dissipation. However, since such an arrangement requires the hard disk 13 to be tightly attached to the thermal pad 16, it is not possible to dispose a vibration damping mechanism between the hard disk 13 and the frame 15.

Figure 3:
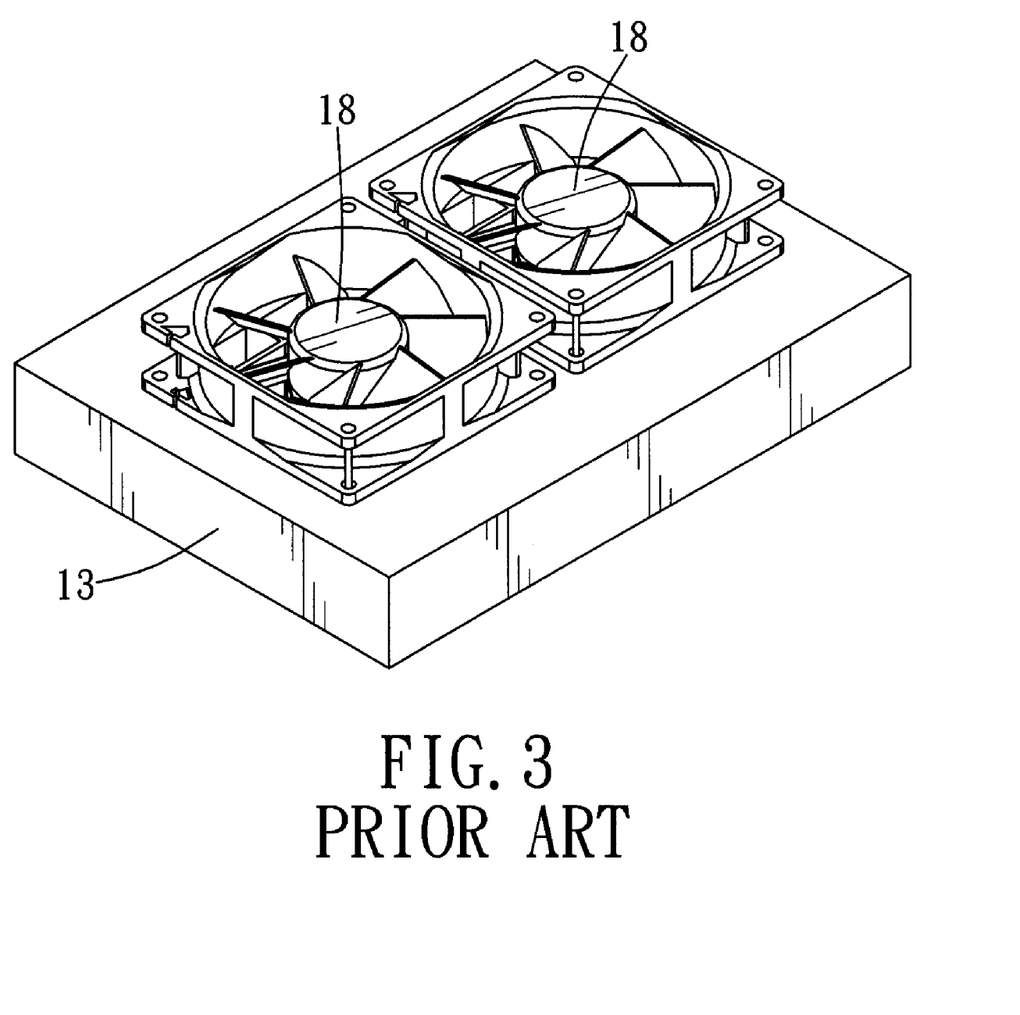
FIG. 3 is a perspective view of a conventional hard disk to illustrate that heat of the hard disk is dissipated via fans.

With reference to FIG. 3, a further approach of effecting heat dissipation is to have fans 18 fastened onto the hard disk 13, so that the fans 18 can disperse the heat generated by the hard disk 13. However, mounting of the fans 18 on the hard disk 13 increases the overall thickness so that the assembly of the hard disk 13 and the fans 18 is not suitable for installation in a miniaturized computer. In addition, such use of the fans 18 for heat dissipation is not applicable to fanless personal computers. Furthermore, since there is no arrangement of a vibration damping mechanism, when the hard disk 13 vibrates, operation of the fans 18 may result in uneven torque, which may amplify the vibration of the hard disk 13.

Figure 4:
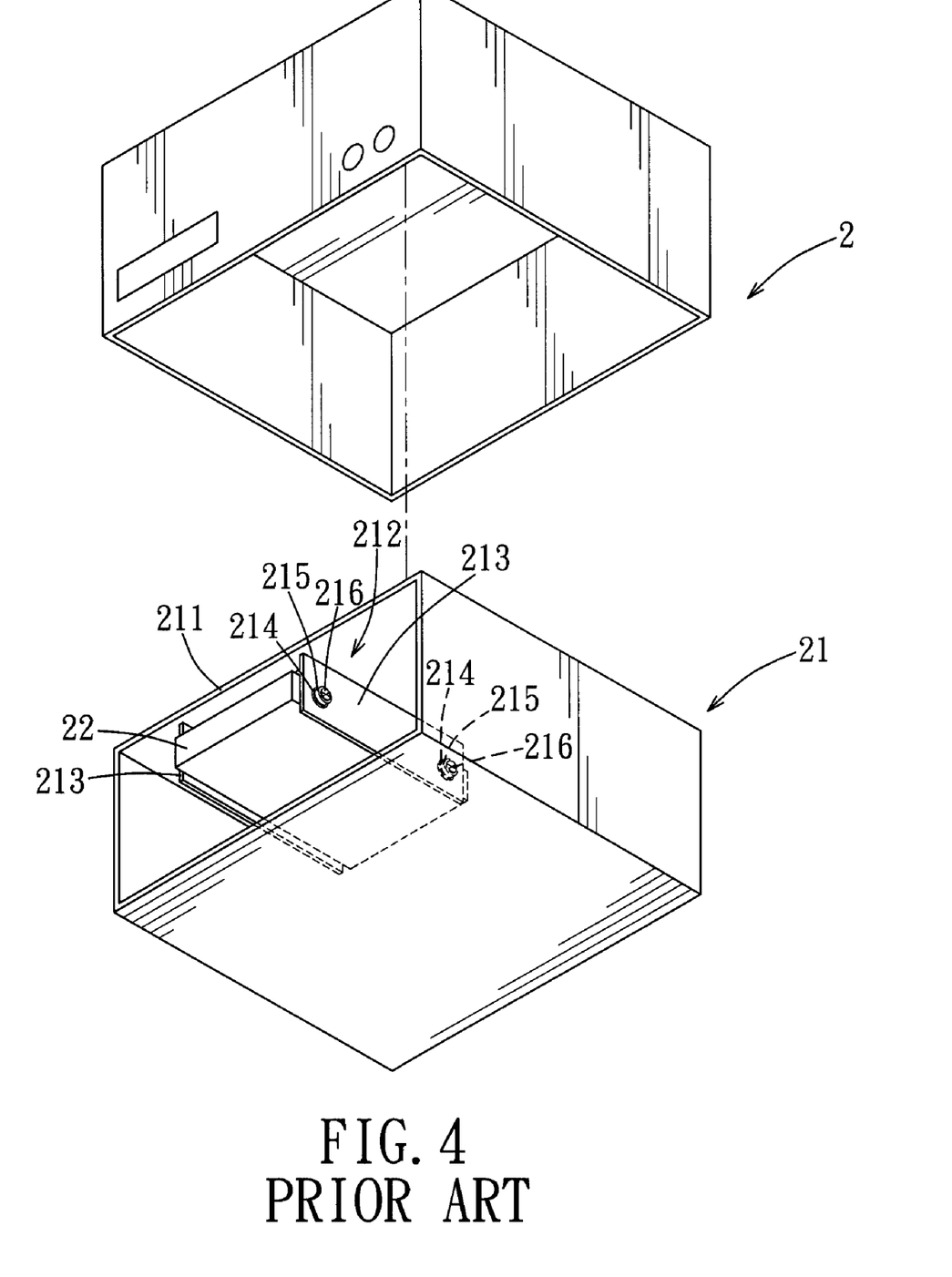
FIG. 4 is a perspective view of still another conventional computer to illustrate a hard disk that is suspended on cushioning members.

On the other hand, there are the following various vibration damping arrangements for hard disks:

With reference to FIG. 4, a securing seat 212 is provided on a bottom face of an upper frame panel 211 of a frame 21 of a computer 2. A hard disk 22 is disposed between two side plates 213 of the securing seat 212. Each of the side plates 213 is provided with two retaining holes 214, and two cushioning members 215 respectively retained in the retaining holes 214. By fastening the cushioning members 215 respectively onto the hard disk 22 using a plurality of screws 216, the cushioning members 215 can be coupled to the hard disk 22. Although the use of the cushioning members 215 to suspend the hard disk 22 may reduce the vibration transmitted to the hard disk 22 from the frame 21, the hard disk 22 is not in direct contact with the securing seat 212 of the frame 21, so that the heat generated by the hard disk 22 is dissipated merely through convection with air inside the computer 2. Consequently, the heat dissipation of the hard disk 22 is unsatisfactory.

In a vibration damping device of a notebook computer module disclosed in R.O.C. Patent Publication No. 437980 (Application No. 088209440), a spring is disposed between a mounting surface of a hard disk and a support frame, and another spring is disposed between an end of a securing sleeve and the support frame such that the two springs can provide a damping or cushioning force to protect the hard disk when the notebook computer module is vibrated. However, such a vibration damping device does not provide a heat dissipating mechanism for the hard disk.

Since the prior art fails to address both heat dissipation and vibration damping concerns associated with hard disks, how to conceive an arrangement of heat dissipation and vibration damping for a hard disk of an electronic device is a subject of endeavor in the industry.

SUMMARY OF THE INVENTION

Therefore, an object of the present invention is to provide a vibration damping mechanism that is adapted for mounting of a hard disk thereon and that provides the hard disk with good heat dissipating and vibration damping functionalities.

Another object of the present invention is to provide an electronic device having a vibration damping mechanism for mounting of a hard disk thereon and capable of providing the hard disk with good heat dissipating and vibration damping functionalities.

Other objects and advantages of this invention will become more apparent from the technical features disclosed herein.

In order to achieve a part or all of the aforesaid objects or other objects, an embodiment of a vibration damping mechanism according to this invention is adapted for mounting of a hard disk. The vibration damping mechanism includes a frame, a plurality of cushioning members, a heat sink, and a plurality of fastening members.

The frame has a base plate and a plurality of supporting arms disposed spacedly on the base plate. Each of the cushioning members is disposed on a respective one of the supporting arms, and has a through hole. The heat sink is adapted to support the hard disk thereon such that the hard disk lies flat against and is secured on the heat sink. The heat sink has a plurality of fastening holes. Each of the fastening members extends through the through hole in a respective one of the cushioning members and threadedly engages a respective one of the fastening holes such that the heat sink is suspended on the supporting arms and abuts against the cushioning members.

In an embodiment of this invention, the heat sink is in the form of a plate, and has a weight greater than that of the hard disk.

In an embodiment of this invention, a supporting point is defined between each of the fastening members and the respective one of the fastening holes, and a center of gravity of an assembly of the heat sink and the hard disk is located below the supporting points.

In an embodiment of this invention, the heat sink has a length and a width that are respectively greater than those of the hard disk, the heat sink has a size greater than that of the hard disk, and the hard disk lies flat against and is secured on a top face of the heat sink.

In an embodiment of this invention, the frame defines a receiving space, and the frame further has a surrounding wall formed on an inner face of the base plate, and an opening defined by the surrounding wall so as to communicate the receiving space with the outside. The supporting arms are disposed spacedly on the surrounding wall. The heat sink and the hard disk are accommodated in the receiving space such that the heat sink is exposed from the opening.

In an embodiment of this invention, the heat sink has a heat conducting plate, and a plurality of heat-dissipating fins projecting from a bottom face of the heat conducting plate. The hard disk lies flat against and is secured on a top face of the heat conducting plate. The fastening holes are formed in the top face of the heat conducting plate. The cushioning members abut against the top face of the heat conducting plate.

In the vibration damping mechanism of this invention, the arrangement of the heat sink for supporting the hard disk allows the bottom face of the hard disk to completely lie flat and abut against the top face of the heat conducting plate of the heat sink to effectively increase the area of contact between the hard disk and the heat sink for enhancing the heat transfer efficiency. Such arrangement, in combination with the arrangement of the heat-dissipating fins of the heat sink that are exposed from the frame through the opening to permit direct heat transfer of the heat generated by the hard disk to the outside via the heat sink, achieves a good heat dissipating effect. In addition, since the heat sink is suspended on the supporting arms of the frame, and since the top face of the heat conducting plate of the heat sink abuts against the bottom face of the cushioning members, the cushioning members may provide the heat sink and the hard disk with a cushioning effect, whereby the vibration damping mechanism may provide both good heat dissipation and good vibration damping.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

It is noted herein that, in the following description, directional terms, such as top, bottom, left, right, front, and rear, are defined in relation to the drawings, and are intended to facilitate description of the present invention rather than limit the scope of the present invention.

Figure 5:
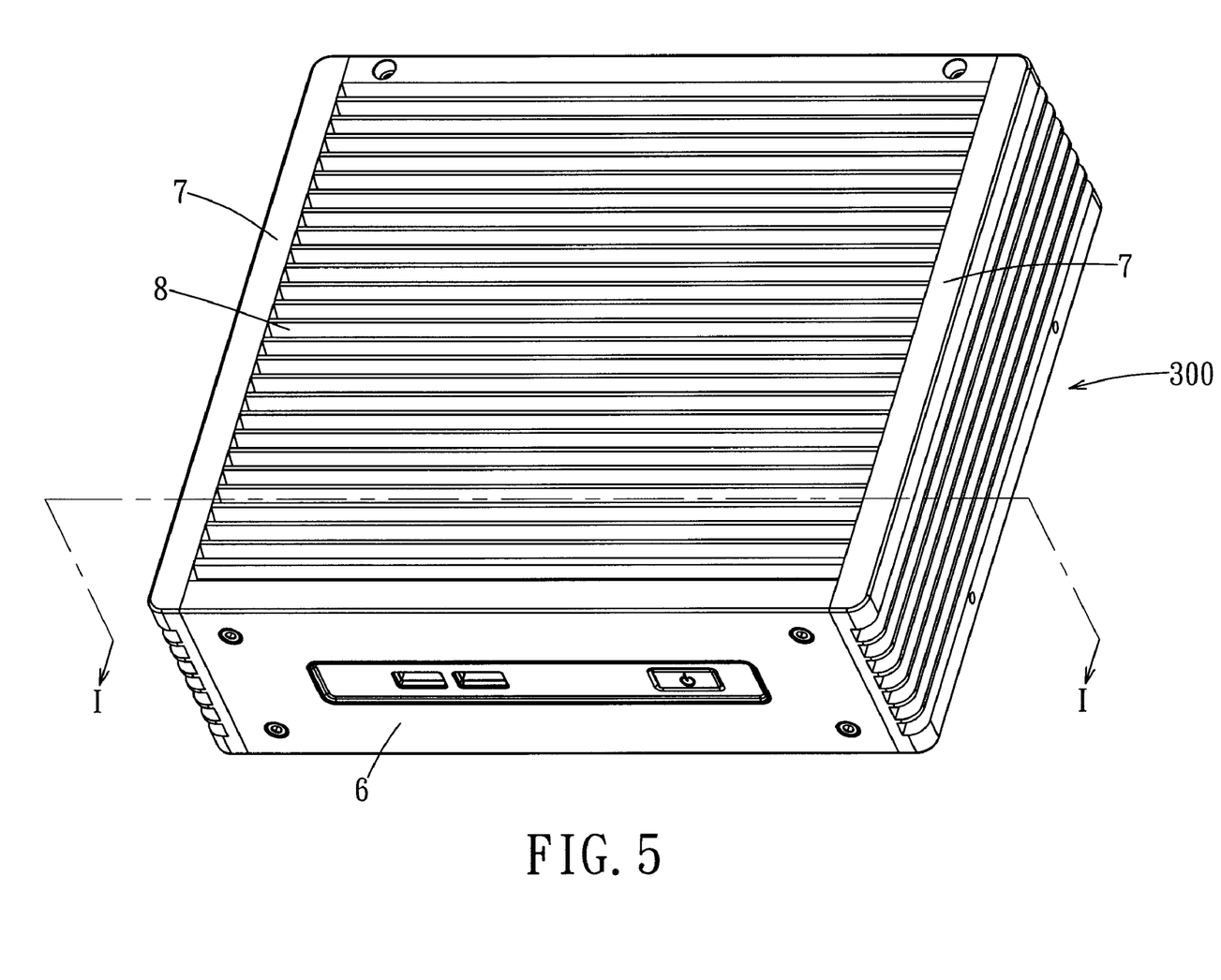
FIG. 5 is a perspective view of a preferred embodiment of an electronic device having a vibration damping mechanism according to the present invention.
Figure 6:
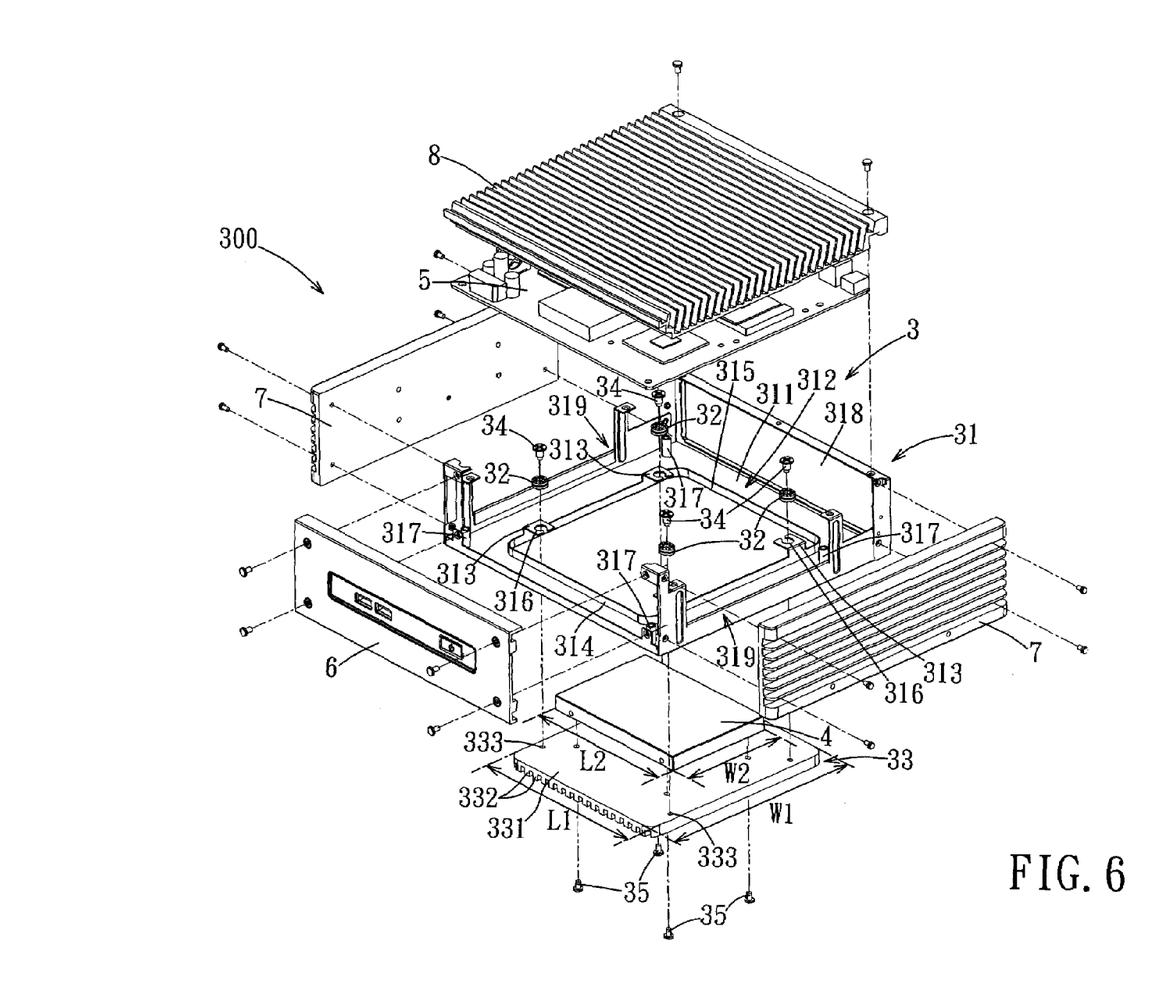
FIG. 6 is an exploded perspective view of the preferred embodiment of an electronic device having a vibration damping mechanism according to the present invention.

FIGS. 5 and 6 show a preferred embodiment of an electronic device 300 having a vibration damping mechanism 3 according to the present invention. The electronic device 3 is a fanless computer, and includes the vibration damping mechanism 3, a hard disk 4, a motherboard 5, a face panel 6, two side panels 7, and a top panel 8.

Figure 7:
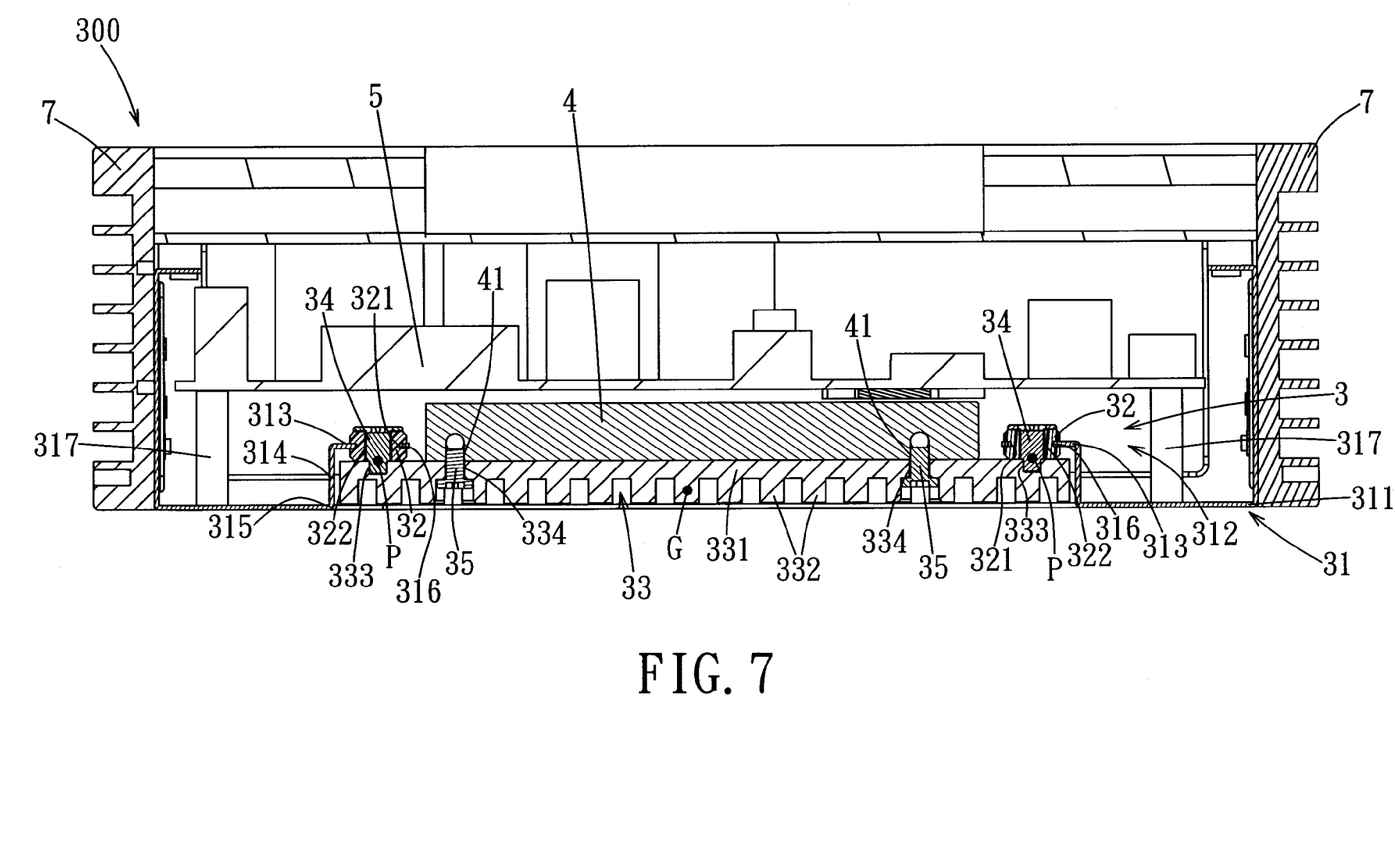
FIG. 7 is a sectional view taken along line I-I of FIG. 5 to illustrate a heat sink supporting a hard disk and suspended on supporting arms of a frame.

As shown in FIGS. 5, 6 and 7, the vibration damping device 3 includes a frame 31, a plurality of cushioning members 32, a heat sink 33, a plurality of fastening members 34, and a plurality of screws 35. The frame 31 is formed from a metal material, and has a base plate 311 and a plurality of supporting arms 313. The frame 31 defines a receiving space 312. The base plate 311 has an inner face provided with a surrounding wall 314 that extends upwardly therefrom. The surrounding wall 314 defines an opening 315 that permits the receiving space 312 to communicate with the outside. Each of the supporting arms 313 projects from a top end of the surrounding wall 314, and has an inverted L-shape. Each of the supporting arms 313 has a retaining groove 316 for clamping a respective one of the cushioning members 32 and disposed above the opening 315. Each of the cushioning members 32 is formed from a resilient material, such as rubber or silicone. Each of the cushioning members 32 has a gripped portion 321 for clamping by the retaining groove 316, and a through hole 322 for passage of a respective one of the fastening members 34 therethrough.

The frame 31 further has a plurality of posts 317 projecting from the inner face of the base plate 311, a rear plate 318 extending upwardly from a rear side of the base plate 311, and two side frame plates 319 respectively formed on left and right sides of the base plate 311. The motherboard 5 may be secured on the posts 317 using screws. The two side panels 7 may be fastened respectively to the two side frame plates 319 using screws. The face panel 6 may be fastened to front ends of the side frame plates 319 and a front end edge of the base plate 311 using screws. The top panel 8 may be fastened to a top end of the rear plate 318 and top ends of the side frame plates 319 using screws. With the arrangement of the rear plate 318 and the side frame plates 319 of the frame 31, the face panel 6, the side panels 7, and the top panel 8 may be assembled to the frame 31.

The heat sink 33 is in the form of a plate and is formed from a metal material. The heat sink 33 has a heat conducting plate 331 for supporting the hard disk 4 thereon, and a plurality of heat-dissipating fins 332 arranged at spaced intervals on a bottom face of the heat conducting plate 331. A top face of the heat conducting plate 331 is provided with a plurality of fastening holes 333. Each of the fastening holes 333 is disposed for threaded engagement with a respective one of the fastening members 34 such that the heat sink 33 may be suspended on the supporting arms 313 through the fasteners 34 and such that the top face of the heat conducting plate 331 may abut against bottom faces of the cushioning members 32. Thus, the cushioning members 32 may provide the heat sink 33 with a cushioning effect. In addition, the hard disk 4 has a plurality of screw holes 41 formed in a bottom face thereof. The heat sink 33 has a plurality of through holes 334 corresponding in position to the screw holes 41. By extending the screws 35 from a lower side of the heat sink 33 through the through holes 334 and into the screw holes 41 in the hard disk 4, the hard disk 4 can be fastened to the heat conducting plate 331 of the heat sink 33, with the bottom face of the hard disk 4 lying flat and abutting against the top face of the heat conducting plate 331. In this embodiment, the specification of the hard disk 4 is 2.5 inches, and the heat sink 33 has a length (L1) and a width (W1), which are respectively greater than a length (L2) and a width (W2) of the hard disk 4. Therefore, the top face of the heat conducting plate 331 is larger than the bottom face of the hard disk 4 in area, and the bottom face of the hard disk 4 can completely lie flat and abut against the top face of the heat conducting plate 331, thereby effectively increasing the area of contact between the hard disk 4 and the heat sink 33 to enhance the heat transfer efficiency as well as the heat dissipating effect.

Figure 8:
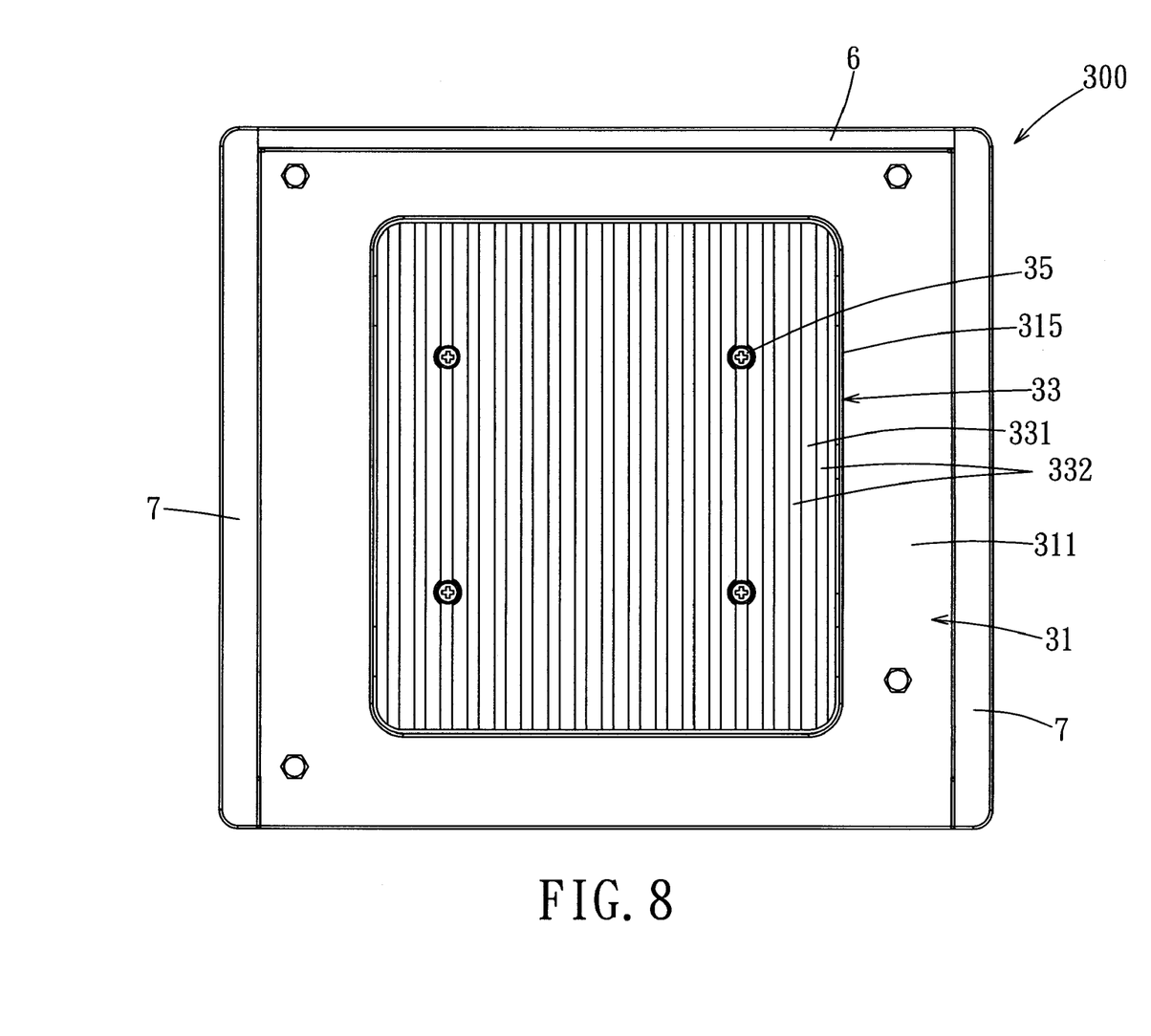
FIG. 8 is a bottom view of the preferred embodiment of an electronic device having a vibration damping mechanism according to the present invention.

During assembly of the electronic device 300, the hard disk 4 is fastened to the top face of the heat conducting plate 331 of the heat sink 33 using the screws 35, and the cushioning members 32 are subsequently mounted on the supporting arms 313 of the frame 31, respectively, such that the retaining grooves 316 of the supporting arms 313 respectively clamp the gripped portions 321 of the cushioning members 32. Thereafter, the fastening members 34 are extended respectively through the through holes 322 in the cushioning members 32 and are respectively and threadedly engaged in the fastening holes 333 in the heat sink 33 such that the heat sink 33 and the hard disk 4 are suspended on the supporting arms 313 of the frame 31, and such that the top face of the heat conducting plate 331 of the heat sink 33 abuts against the bottom face of the cushioning members 32. Thus, the hard disk 4 and the heat sink 33 are both accommodated in the receiving space 312, and the heat-dissipating fins 332 of the heat sink 33 are exposed from the frame 31 through the opening 315 (as shown in FIG. 8), with a clearance maintained between the heat sink 33 and the surrounding wall 314 of the base plate 311 to provide a space to accommodate vibration of the heat sink 33. The size of the opening 315 is dimensioned to correspond to that of the heat sink 33. Subsequently, the motherboard 5 is fastened to the posts 317 of the base plate 311 using screws such that the motherboard 5 is spaced apart above the hard disk 4. Thereafter, the top panel 8 is fastened to the top end of the rear plate 318 and the top ends of the side frame plates 319, the face panel 6 is fastened to the front ends of the side frame plates 319 and the front end edge of the base plate 311, and the two side panels 7 are fastened respectively to the two side frame plates 319 in sequence, thereby accomplishing assembly of the electronic device 300.

Since the top face area of the heat conducting plate 331 of the heat sink 33 is greater than the bottom face area of the hard disk 4, the bottom face of the hard disk 4 can completely lie flat and abut against the top face of the heat conducting plate 331, thereby effectively increasing the area of contact between the hard disk 4 and the heat sink 33 for enhancing the heat transfer efficiency and the heat dissipating effect. Furthermore, since the heat-dissipating fins 332 of the heat sink 33 are exposed from the frame 31 through the opening 315, convection between the heat sink 33 and the air outside the frame 31 is possible, so that the heat generated during operation of the hard disk 4 may be directly channeled to the outside of the electronic device 300, thereby achieving good heat dissipation. Furthermore, since the hard disk 4 is disposed between the motherboard 5 and the base plate 311 of the frame 31, the motherboard 5 can prevent a part of the heat within the electronic device 300 from reaching the hard disk 4 so as to alleviate the effect of the heat generated outside the hard disk 4 on the hard disk 4.

On the other hand, after the heat sink 33 supporting the hard disk 4 is mounted on the supporting arms 313 of the frame 31 through the fastening members 34, since the heat sink 33 is heavier than the hard disk 4, and since the heat sink 33 is larger than the hard disk 4 in size, the overall weight of the frame 311 of the vibration damping mechanism 3 is increased, thereby reducing the natural frequency of the supporting arms 313 of the frame 31 when suspending the heat sink 33, and thereby reducing the amount of vibration transmitted to the hard disk 4 when the electronic device 300 is subjected to an external force. After the heat sink 33 is mounted on the supporting arms 313, the structural rigidity among the heat sink 33 and the supporting arms 313 is enhanced, and the degree of freedom of motion of the structure is reduced, thereby preventing amplification of vibration due to multiple modes of vibration. Furthermore, a supporting point (P) is defined between each of the fasteners 34 and the corresponding one of the fastening holes 333, and the center of gravity (G) of the assembly of the hard disk 4 and the heat sink 33 will fall on the heat sink 33. The center of gravity (G) is located below the supporting points (P), so that the heat sink 33 and the hard disk 4 suspended on the supporting arms 313 are more stable, and transmission of the vibration generated by the hard disk 4 per se to the frame 31 or vibration generated by the frame 31 to the hard disk 4 can be inhibited, thereby reducing generation of resonance.

It is noted that the specification of the hard disk 4 is not limited to the disclosure in this embodiment. The hard disk 4 may be 3.5 inches or has any other suitable specification. However, the heat sink 33 is required to meet the conditions disclosed in this embodiment in design, i.e., the length (L1) and width (W1) of the heat sink 33 should be respectively greater than the length (L2) and width (W2) of the hard disk 4, the weight of the heat sink 33 should be greater than that of the hard disk 4, and the size of the heat sink 33 should be larger than that of the hard disk 4. In addition, the center of gravity (G) of the assembly of the hard disk 4 and the heat sink 33 should be located below the supporting points (P) in order to provide the hard disk 4 with good heat dissipating and vibration damping effects.

In sum, in the electronic device 300 according to this embodiment, the arrangement of the heat sink 33 for supporting the hard disk 4 allows the bottom face of the hard disk 4 to completely lie flat and abut against the top face of the heat conducting plate 331 of the heat sink 33 to effectively increase the area of contact between the hard disk 4 and the heat sink 33 for enhancing the heat transfer efficiency. Such arrangement, in combination with the arrangement of the heat-dissipating fins 332 of the heat sink 33 that are exposed from the frame 31 through the opening 315 to permit direct transfer of heat generated by the hard disk 4 to the outside via the heat sink 33, achieves a good heat dissipating effect. In addition, since the heat sink 33 is suspended on the supporting arms 313 of the frame 31, and since the top face of the heat conducting plate 331 of the heat sink 33 abuts against the bottom face of the cushioning members 32, the cushioning members 32 may provide the heat sink 33 and the hard disk 4 with a cushioning effect, whereby the vibration damping mechanism 3 may provide both good heat dissipation and good vibration damping for the hard disk 4.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements. In addition, it should be appreciated that the embodiment as described herein or any of the claims as appended hereto does not necessarily have to achieve all of the objects, advantages or features disclosed herein. Moreover, the abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

I claim:

1. A vibration damping mechanism for mounting of a hard disk, said vibration damping mechanism comprising:
    a frame having a base plate and a plurality of supporting arms disposed spacedly on said base plate;
    a plurality of cushioning members disposed respectively on said supporting arms, each of said cushioning members having a through hole;
    a heat sink adapted to support the hard disk thereon such that the hard disk lies flat against and is secured on said heat sink, said heat sink having a plurality of fastening holes; and
    a plurality of fastening members extending respectively through said through holes in said cushioning members and engaging threadedly and respectively said fastening holes such that said heat sink is suspended on said supporting arms and abuts against said cushioning members.

2. The vibration damping mechanism according to claim 1, wherein said heat sink is in the form of a plate and has a weight greater than that of the hard disk.

3. The vibration damping mechanism according to claim 2, wherein a supporting point is defined between each of said fastening members and the respective one of said fastening holes, and a center of gravity of an assembly of said heat sink and the hard disk is located below the supporting points.

4. The vibration damping mechanism according to claim 3, wherein said heat sink has a length and a width that are respectively greater than those of the hard disk, and a size greater than that of the hard disk, the hard disk lying flat against and being secured on a top face of said heat sink.

5. The vibration damping mechanism according to claim 4, wherein said frame further has a receiving space defined by said base plate, a surrounding wall formed on an inner face of said base plate, and an opening defined by said surrounding wall so as to communicate said receiving space with the outside, said supporting arms being disposed spacedly on said surrounding wall, said heat sink and the hard disk being accommodated in said receiving space such that said heat sink is exposed from said opening.

6. The vibration damping mechanism according to claim 5, wherein said heat sink has a heat conducting plate and a plurality of heat-dissipating fins projecting from a bottom face of said heat conducting plate, the hard disk lying flat against and being secured on a top face of said heat conducting plate, said fastening holes being formed in said top face of said heat conducting plate, said cushioning members abutting against said top face of said heat conducting plate.

7. The vibration damping mechanism according to claim 1, wherein a supporting point is defined between each of said fastening members and the respective one of said fastening holes, and a center of gravity of an assembly of said heat sink and the hard disk is located below the supporting points.

8. The vibration damping mechanism according to claim 1, wherein said heat sink is in the form of a plate, and has a length and a width that are respectively greater than those of the hard disk, and a size greater than that of the hard disk, the hard disk lying flat against and being secured on a top face of said heat sink.

9. The vibration damping mechanism according to claim 1, wherein said frame defines a receiving space, and further has a surrounding wall formed on an inner face of said base plate, and an opening defined by said surrounding wall so as to communicate said receiving space with the outside, said supporting arms being disposed spacedly on said surrounding wall, said heat sink and the hard disk being accommodated in said receiving space such that said heat sink is exposed from said opening.

10. An electronic device having a vibration damping mechanism, comprising:
    a hard disk;
    a vibration damping mechanism for mounting of said hard disk, said vibration damping mechanism including:
        a frame having a base plate and a plurality of supporting arms disposed spacedly on said base plate;
        a plurality of cushioning members disposed respectively on said supporting arms, each of said cushioning members having a through hole;
        a heat sink for supporting said hard disk thereon such that said hard disk lies flat against and is secured on said heat sink, said heat sink having a plurality of fastening holes; and
        a plurality of fastening members extending respectively through said through holes in said cushioning members and engaging threadedly and respectively said fastening holes such that said heat sink is suspended on said supporting arms and abuts against said cushioning members.

11. The electronic device having a vibration damping mechanism according to claim 10, wherein said heat sink is in the form of a plate and has a weight greater than that of said hard disk.

12. The electronic device having a vibration damping mechanism according to claim 11, wherein a supporting point is defined between each of said fastening members and the respective one of said fastening holes, and a center of gravity of an assembly of said heat sink and said hard disk is located below the supporting points.

13. The electronic device having a vibration damping mechanism according to claim 12, wherein said heat sink has a length and a width that are respectively greater than those of said hard disk, and a size greater than that of said hard disk, said hard disk lying flat against and being secured on a top face of said heat sink.

14. The electronic device having a vibration damping mechanism according to claim 13, wherein said frame further has a receiving space defined by said base plate, a surrounding wall formed on an inner face of said base plate, and an opening defined by said surrounding wall so as to communicate said receiving space with the outside, said supporting arms being disposed spacedly on said surrounding wall, said heat sink and said hard disk being accommodated in said receiving space such that said heat sink is exposed from said opening.

15. The electronic device having a vibration damping mechanism according to claim 14, wherein said heat sink has a heat conducting plate and a plurality of heat-dissipating fins projecting from a bottom face of said heat conducting plate, said hard disk lying flat against and being secured on a top face of said heat conducting plate, said fastening holes being formed in said top face of said heat conducting plate, said cushioning members abutting against said top face of said heat conducting plate.

16. The electronic device having a vibration damping mechanism according to claim 15, wherein said frame further has a rear plate extending upwardly from a rear side of said base plate, said electronic device further including a face panel disposed on a front side of said base plate, two side panels respectively disposed on left and right sides of said base plate, a motherboard spaced apart above said hard disk, and a top panel disposed on top ends of said face panel and said rear plate.

17. The electronic device having a vibration damping mechanism according to claim 10, wherein a supporting point is defined between each of said fastening members and the respective one of said fastening holes, and a center of gravity of an assembly of said heat sink and said hard disk is located below the supporting points.

18. The electronic device having a vibration damping mechanism according to claim 10, wherein said heat sink is in the form of a plate, and has a length and a width that are respectively greater than those of said hard disk, and a size greater than that of said hard disk, said hard disk lying flat against and being secured on a top face of said heat sink.

19. The electronic device having a vibration damping mechanism according to claim 10, wherein said frame defines a receiving space, and has a surrounding wall formed on an inner face of said base plate, and an opening defined by said surrounding wall so as to communicate said receiving space with the outside, said supporting arms being disposed spacedly on said surrounding wall, said heat sink and said hard disk being accommodated in said receiving space such that said heat sink is exposed from said opening.

* * * * *